(12) United States Patent
Ben Ayed

(10) Patent No.: US 8,768,306 B1
(45) Date of Patent: Jul. 1, 2014

(54) METHOD FOR ADAPTIVE MOBILE IDENTITY

(71) Applicant: Mourad Ben Ayed, Cupertino, CA (US)

(72) Inventor: Mourad Ben Ayed, Cupertino, CA (US)

( * ) Notice: Subject to any disclaimer, the term of this patent is extended or adjusted under 35 U.S.C. 154(b) by 0 days.

(21) Appl. No.: 14/084,624

(22) Filed: Nov. 20, 2013

(51) Int. Cl.
  *H04W 12/06* (2009.01)
(52) U.S. Cl.
  USPC .......................... 455/411; 709/203; 715/772
(58) Field of Classification Search
  CPC ... H04W 12/06; H04W 4/12; H04M 1/72577; G06F 3/0481; H04L 63/0428; H04L 29/06
  USPC ................ 455/411, 412.1; 715/772; 713/150; 709/203
  See application file for complete search history.

(56) References Cited

U.S. PATENT DOCUMENTS

| 8,467,770 | B1 | 6/2013 | Ben Ayed |
| 8,478,816 | B2 | 7/2013 | Parks et al. |
| 2009/0221266 | A1 | 9/2009 | Ohta et al. |
| 2012/0096386 | A1* | 4/2012 | Baumann et al. ............. 715/772 |
| 2013/0332723 | A1* | 12/2013 | Tan et al. ..................... 713/150 |

* cited by examiner

*Primary Examiner* — Phuoc H Doan
(74) *Attorney, Agent, or Firm* — Daniel B. Schein

(57) ABSTRACT

A method for adapting a mobile identity involves an application publishing different attributes when the application is in the foreground, is in a know location or is in proximity of a beacon then when it is not. The attributes can be scanned wirelessly using short wireless communication.

20 Claims, 6 Drawing Sheets

METHOD FOR ADAPTIVE MOBILE IDENTITY

FIELD OF THE INVENTION

The present invention relates to a method for adaptive mobile identity, and most particularly, publishing different attributes depending on events detected by an application on a mobile phone.

BACKGROUND

Identifying a user remotely and completing a secure transaction with that user has always been a challenge.

Usernames, passwords, one-time passwords and biometrics require contact and cannot be used to perform remote transactions. For example, a merchant cannot send a coupon to a client in the store.

Magnetic cards, smart cards and RFID are costly and require a short distance from a specialized reader. They cannot change state based on user input, location or connection state. The merchant cannot send a coupon to a client in the store.

NFC uses very short range of 4 cm and has limited applications, mostly in the contact applications. It cannot enable a remote device to scan and get information. It cannot enable an application to scan and learn about its environment.

Bluetooth SPP is another service that is used to transfer data between devices. While Bluetooth SPP is not available on iOS devices, Bluetooth SPP service is rigid. It requires device pairing. When the SPP service is started, the device publishes the service name, however, it does not publish attributes associated with the service.

Thus, a need exists for a method that enables a mobile device to publish different states based on application state, location, connection state and user input, and to remotely identify the identity of the mobile device.

SUMMARY OF THE INVENTION

A method for adaptive mobile identity comprising:
running a first application onboard a first mobile device,
wherein upon or after activation of an icon associated with the first application,
the first application can go from the background to the foreground of the first mobile device;
whereby upon or after the first application goes to the foreground of the first mobile device,
publishing at least one first scannable attribute indicating the first application is in the foreground,
wherein the at least one first scannable attribute can be read or can be scanned wirelessly using short wireless communication technology,
wherein if the first application stops running,
the at least one first scannable attribute is not published;
whereby upon or after the first application goes from the foreground to the background of the first mobile device,
either changing the value corresponding to the at least one first attribute
or not publishing the at least one first attribute
or publishing at least one second scannable attribute that was not recently published.

A method for an adaptive mobile identity comprising:
running a first application onboard a first mobile device,
wherein upon or after activation of an icon associated with the first application, the first application can go from the background to the foreground of the first mobile device;
whereby upon or after the first application starts, publishing at least one first attribute,
wherein the at least one first scannable attribute can be read or can be scanned wirelessly using short wireless communication technology,
wherein if the first application stops running,
the at least one first scannable attribute is not published;
whereby upon or after an event selected from the group consisting of:
the first application detects a known location using a means selected from the group consisting of: a GPS, Wifi and a Bluetooth beacon,
the first application detects motion or tilt or acceleration onboard the first mobile device,
the first application connects to a remote device using short wireless communication technology,
the first application detects a user action corresponding to activating an icon in the first application running onboard the first mobile device,
and the first application detects a user action corresponding to activating a menu in the first application running onboard the first mobile device,
either changing the value corresponding to the at least one first scannable attribute from an old value to a new value corresponding to the event
or not publishing the at least one first attribute
or publishing at least one second scannable attribute that was not published prior to the event.

A method for an adaptive mobile identity comprising:
running a first program onboard a first mobile device,
wherein the first program can go from the foreground to the background of the first mobile device,
publishing at least one first scannable attribute that can be read or can be scanned wirelessly using short wireless communication technology,
wherein if the first application stops running,
the at least one first scannable attribute is not published;
running a second program onboard a second mobile device,
whereby upon or after detection of motion or tilt or acceleration onboard the second mobile device,
changing the value corresponding to at least one second scannable attribute from an idle state to a motion state, wherein the at least one second scannable attribute can be read or can be scanned wirelessly using short wireless communication technology,
wherein after the second mobile device stays idle for a predetermined period of time,
either changing the value corresponding to the at least one second scannable attribute from a motion state to a different state
or not publishing the at least one second attribute
or publishing at least one third scannable attribute that was not published prior to detecting the motion or tilt or acceleration;
whereby the first mobile device can scan and can detect a second mobile device running the second program,
wherein upon or after detecting at least one second mobile device with an attribute indicating the at least one second mobile device detected motion,
either searching a database for item information corresponding to the identifier of the at least one second mobile device and displaying the item information onboard the first mobile device
or sending information to the database comprising the identifiers of the at least one second mobile device and the current location of the first mobile device, wherein the item information is selected from the group consisting of a photo, a datasheet, a record, a file, a stream and a log.

BRIEF DESCRIPTION OF THE FIGURES

The present inventions may be more clearly understood by referring to the following figures and further details of the inventions that follow.

FURTHER DETAILS OF THE INVENTIONS

Figure 1:
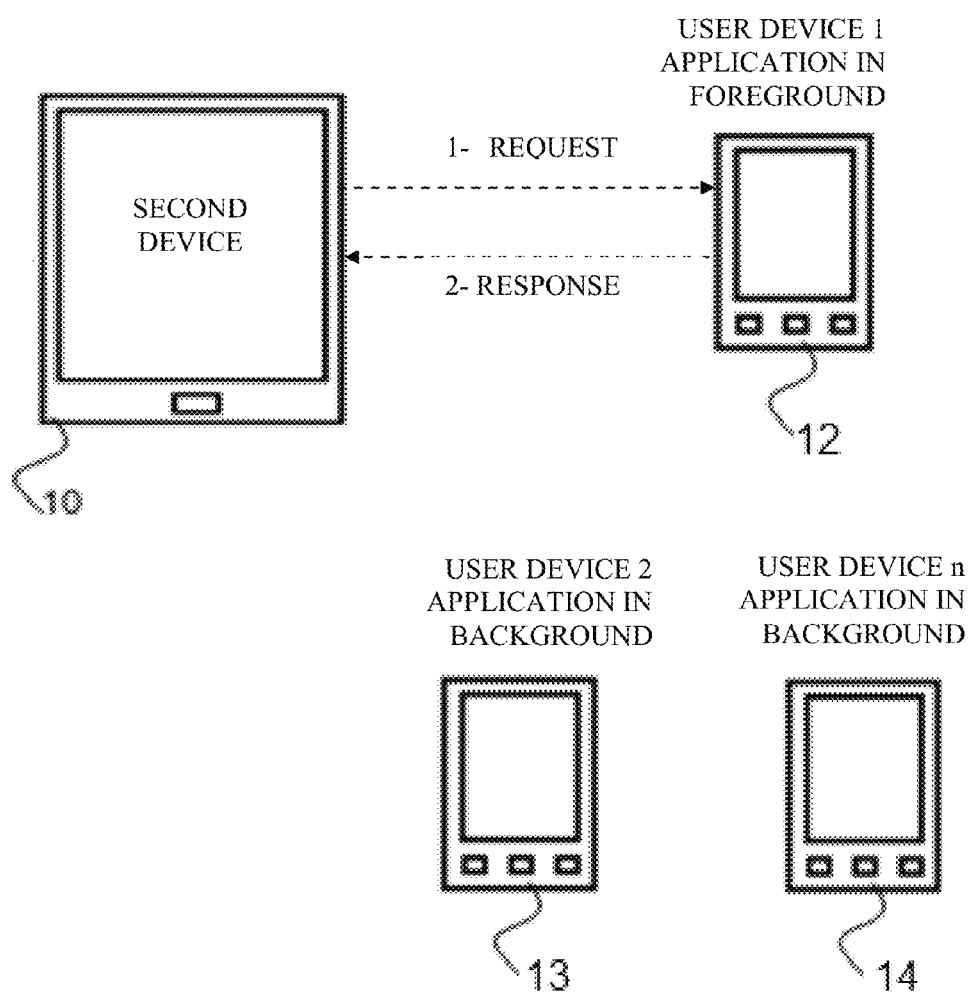
FIG. 1 is a schematic illustrating a scanner and a number of mobile devices

In Bluetooth 2.0, applications had limited control over Bluetooth, or changing the properties of the services while the application was running.

Bluetooth 2.0 requires physical pairing, and do not allow to change the service name or to assign user-defined labels to the service (such as SPP or HFP) or to assign labels or values to the properties of the service that can be visible remotely or scannable from a distance. This prevents other devices from reading properties or state information remotely. This invention uses Bluetooth LE to publish the state of the device upon detection of specific events.

The current invention teaches a method for detecting events, and changing characteristics to correspond to those events.

The current invention teaches updating scannable attributes that can be scanned remotely with different states depending on if the application is in the foreground or background, if the location of the user is know or not, or if the user is connected to a known device or not.

The published scannable attribute information can now be scanned remotely, and used to enable new applications that were not possible before.

One of these applications is identifying a user remotely from among a number of users. By default, the authorization application is in the background (default behavior on smart phones), and when it comes to the foreground, it publishes different attributes that are scannable from a remote device. When in the foreground, the authorization application responds to a reader differently (by updating a scannable attribute to indicate that the authorization application is in the foreground) than when the authorization application is in the background (by updating a scannable attribute to indicate that the authorization application is in the background). After a pre-determined period of time, the application changes state and stops responding to requests (by updating a scannable attribute to indicate that the authorization application is in the foreground or that it timed out or that it is not responding . . . ).

A user brings an authorization application to the foreground by touching it or clicking it or activating it or launching it. The other users do not bring their authorization application to the foreground.

After the scanner scans an application in the foreground, a secure transaction can take place between the scanning device and the receiver device. This enables the merchant with a scanner to find new clients without seeing the old clients that may still have their application in the foreground. In the meantime, the users that are not targets have their authentication application running in the background.

Also by default, if the first mobile device locks or if a menu button is activated, the first application can go to the background of the first mobile device.

Another application involves a user going to a store, and publishing a new attribute corresponding to the second store. The new attribute can be obtained from a remote database. The remote database can also indicate if the new attribute can be published or not.

Another application involves a user pushing a menu or icon inside an application to indicate to other parties with a scanning application that he/she is available for chat.

Another application involves tokens that publish information after they detect motion. This enables scanners to scan for those tokens that are moving and to report them to a database that can track their movement.

Another application involves a user identifying a token from among a number of tokens by shaking it. The token changes its attributes, and the scanner can now identify the token that the user is interested in. The scanner can get information about the token from the database and present it to the user.

Another application involves a user identifying a token from among a number of tokens by shaking it. The token changes its attributes, and the scanner can now identify the token that the user is interested in. The scanner can get information about the token from the database and present it to the user.

Prior to this invention, these functions necessitated dedicated hardware that is not dynamic in nature.

Referring to FIG. 1, a number of user devices is shown. User device 12 shows a first device with an authorization application in the foreground. User device 13 shows a second device with an authorization application in the background. Similarly, user device 14 shows an n'th device with an authorization application in the background.

A second device 10 identifies user device 12 and exchanges data with it. Second device 10 can be any device including a mobile device, a computing device, a television set, a point of sale terminal, an electronic system, and a door entry reader. User device 12, 13, 14 communicates with second device 10 using wireless/cellular data communication or short wireless communication or both.

Figure 2:
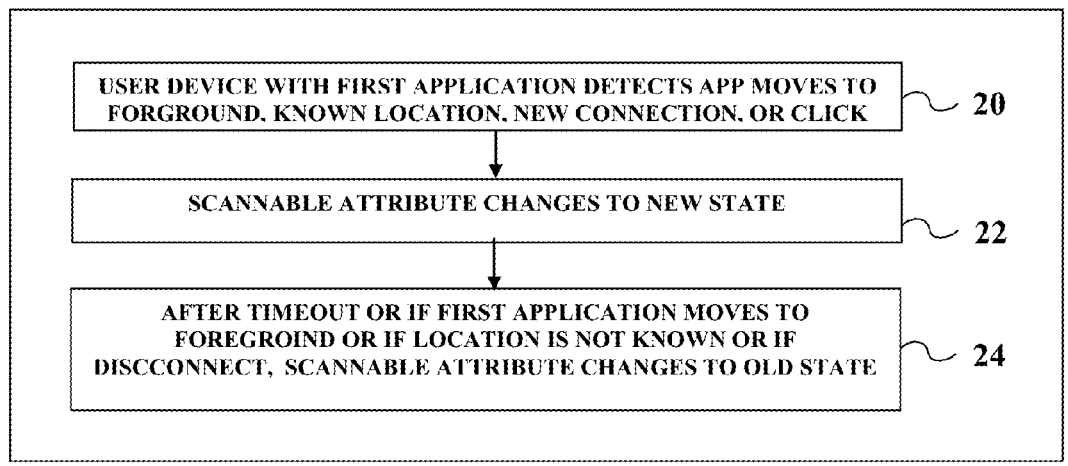
FIG. 2 is a flowchart illustrating a user device changing its attributes

Referring to FIG. 2, the flowchart illustrates a user device changing its attributes after detecting an event or a change in conditions.

In step 20, after running the application on a mobile device, the application moves to the foreground upon activating an application icon or the mobile device enters a known/trusted location or the application connects to a new device or after a user click, the application changes its scannable attributes to a state that indicates the new state or new conditions in step 22. The scannable attribute can be read or can be scanned wirelessly using short wireless communication technology such as Bluetooth, Bluetooth LE/Low Energy/4.0.

If the application stops running, the scannable attributes published by the application stop being published.

For example, the Bluetooth LE characteristic indicating foreground or background can change value from background to foreground when the application goes to the foreground. Alternatively, an attribute indicating known location or not can change from unknown location to known location when the device detects a known location through GPS, WIFI or fixed Bluetooth beacons. Alternatively, if the an attribute indicating connection state can change from not connected to connected when the application connects to a new device. Alternatively, an attribute indicating user preference or user actions can change from no user action to user action or the user is open for chat or can indicate that the user is awaiting connection or can indicate that the user is available . . . when the user clicks a button or an icon or a menu inside the application.

After a timeout period from the event, the attribute that was changed can go back to an initial state indicating that an event is not detected.

In another embodiment, the application can stop publishing an attribute, a characteristic or a service to indicate that the application goes to the background or that the application leaves a known location or that it disconnects.

In another embodiment, the application publishes a new attribute, a characteristic or a service to indicate that the application went to the background or that the application device left a known location or that it disconnected.

The user device can have different characteristics or services or descriptors that can be scanned remotely and that indicate the different states, or can have one characteristic or state.

Figure 3:
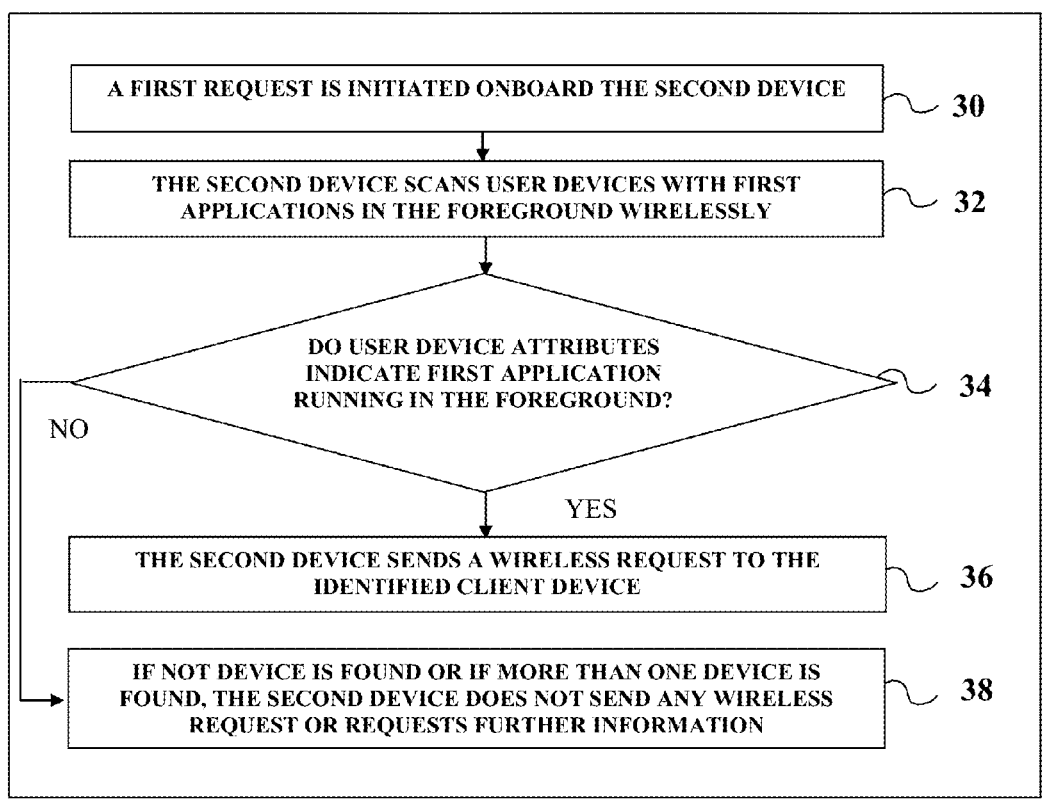
FIG. 3 is a flowchart illustrating scanning a remote device and checking attributes

Referring to FIG. 3, the flowchart illustrates scanning a remote device and checking attributes. The method for identifying a remote client device from among a number of devices and for sending information to the client device. In step 30, a first transaction is initiated onboard second device 10. For example, a merchant initiates a scan for a client device, a remote user initiates a scan, a program automatically initiates a scan every period of time, or a program initiates a scan after sensing motion or heat or change in conditions.

In step 32, the second device 10 scans user devices wirelessly to identify at least one client device with an authorization application in the foreground.

There are several methods to determine if a known application is in the foreground or not: An application on a smart phone can be seen as having 3 operation states: not running, running in the background, and running in the foreground.

When not running, the authorization application will not publish a service or a characteristic indicating it is in the foreground or will not respond to short wireless requests (such as Bluetooth). Typically in client devices such as mobile phones or tablet computers, there is only one foreground application.

An application can switch from the foreground to the background and vice versa on a mobile device or table. The application comes to the foreground when the user clicks on its icon, or touches it, or selects it or performs an action (shake, move . . . ) that triggers the application to go to the foreground. Once the user selects another application, the application is no longer in the foreground, and is assumed to go to the background. If the mobile phone or tablet times out and locks, the application is no longer in the foreground, and is assumed to go to the background. The application can continue to run in the background, however, it will not be displayed in the user interface, and the functions available to an application in the background may be limited by the operating system.

When running in the foreground, or when the authorization application comes to the foreground or when the authorization application is brought to the foreground, the authorization application publishes or broadcasts a state indicating app-in-foreground. When the application is in the foreground, it publishes a different state or service or characteristics than when it is in the background or it will respond differently to wireless messages than when it is in the foreground. That way, other applications can find the state through short wireless communication.

After a predetermined period of time or after receiving a user action or a user authorization, the authorization application can stop broadcasting the state indicating app-in-foreground. Also, after receiving a connection request from a remote device, the authorization application can stop broadcasting the state indicating app-in-foreground.

In another preferred embodiment, after a predetermined period of time from being in the foreground, the authorization application no longer publishes the app-in-foreground state or publishes another state.

When running in the background, the authorization application can be configured to not display the app-in-foreground state or to publish another state.

In another embodiment, the authorization application can keep an internal state of application is in the foreground or background. A second device can connect to the application, and request information about the internal state.

In a preferred embodiment, the authentication application stores at least one first digital key onboard the client device, a password, a random key, a one-time-password generator, a certificate, a Private Key Infrastructure (PKI) key, a symmetric key, an asymmetric key, payment information, access information, and physical access code.

It is noted that the application is enabled with Bluetooth Low Energy, and that it is scannable from a distance longer than 4CM which is the distance of Near Field Communication. Bluetooth Low Energy can be scannable from a distance of 1 m, 5 m, 10 m and up to 20 m.

It is also notes that the application or authentication application is installed by a user and is not factory installed. The authentication application is not part of the operating system. It is installed from an application store. The authentication application is also associated with a user account on a database, can load policies, and can be disabled from the database.

In step 34, if a remote user device with an authentication application running in the foreground is identified, in step 36, the second device 10 sends a wireless request to the identified client device. If not, then in step 38, the second device 10 does not send any wireless request.

The second application can also check the proximity of the client device by measuring RSSI (received signal strength indication) and checking if it is above or below a threshold. The second application can determine the approximate distance of the client device. If the client device is found to be not within a predetermined range (determined by RSSI or other means), then the second device does not send a transaction to the client device.

If second device 10 finds more than one user device with authentication applications running in the background, then it can either not send a wireless request, send a wireless request to both, or prompt the user to select one device among the list of found devices.

The second device can send a request to the client device including: an invoice, a receipt, a reservation, a confirmation, a reward, a charge, transaction details, a coupon, a file, a transaction ID, an encryption key, a decryption key, and information corresponding to the remote client device identifier.

Upon receiving a request from the second device, the authorization application can display the request transaction information onboard the client device, and if the user approves, it can send a response to the second device with user data including: a password, a digital key, payment information, access information, a digital payment certificate, user information, confirmation ID, signature, and a one-time password, The user approval can be a button activation, a menu selection, a touch, a tap, a motion, a one-time password, biometrics, and submitting user credentials.

In a preferred embodiment, the wireless transaction request includes a code indicating a method of user authentication or user approval.

After receiving the user data, the second application can perform an action using the user data including: fill a form, decrypt the user data, encrypt the user data, login, submit a request to a payment processor, submit a request to a payment Application Programming Interface, authorize a transaction, and send the user data to a remote terminal.

The current invention enables new functions that were not previously possible. For example, a person is in a queue, and reaches in front of a cashier. The person is ready to pay for goods. The person brings his/her authorization application to the foreground, the cashier's Point of Sale (POS) system can scan the person's phone using Bluetooth low energy, and will identify only one person with an authorization application in the foreground. The other people in the queue have their phones off or their authorization application in the background.

A normal transaction starts with a second device 10 scanning to find user devices 12 with a known/compatible authorization applications running in the foreground. Second device 10 sends a request for a service to user device 12 either through short wireless communication (Bluetooth low energy, Bluetooth 2.0), or through a database or through a socket.

Figure 4:
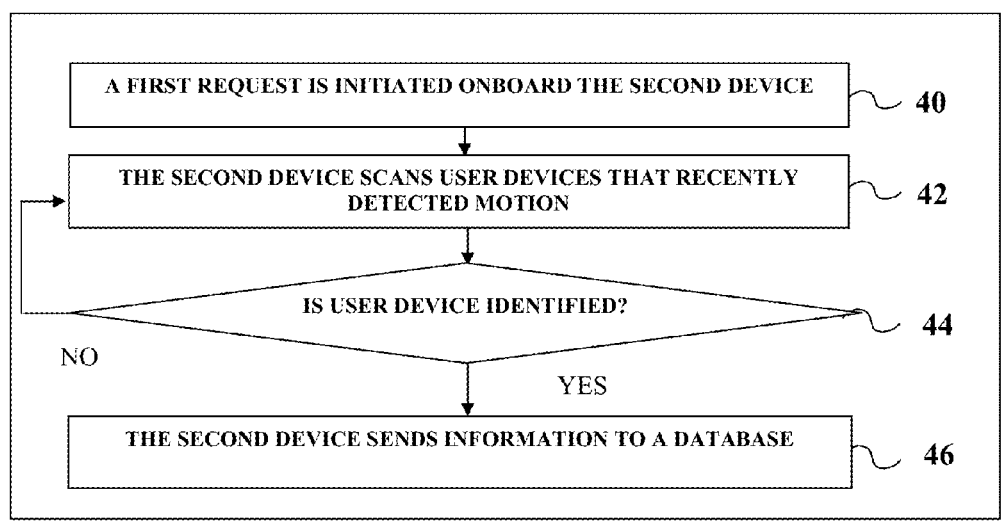
FIG. 4 is a flowchart illustrating a method for sending remote device information to a database

Referring to FIG. 4, a flowchart illustrates a method for sending remote device information to a database.

In step 40, a request is initiated onboard second device 10 to request user information. In step 42, the second device 10 scans mobile devices that recently detected motion. These devices can be Bluetooth LE devices with motion detector, tilt sensor or accelerometer that detect motion, and set a scannable attribute indicating motion is detected, and after a timeout, revert to initial state.

In step 44, if a mobile device that recently detected motion is found, the second device sends information to a remote database in step 46. The information includes the ID of the scanned mobile device and the location of the second device.

Figure 5:
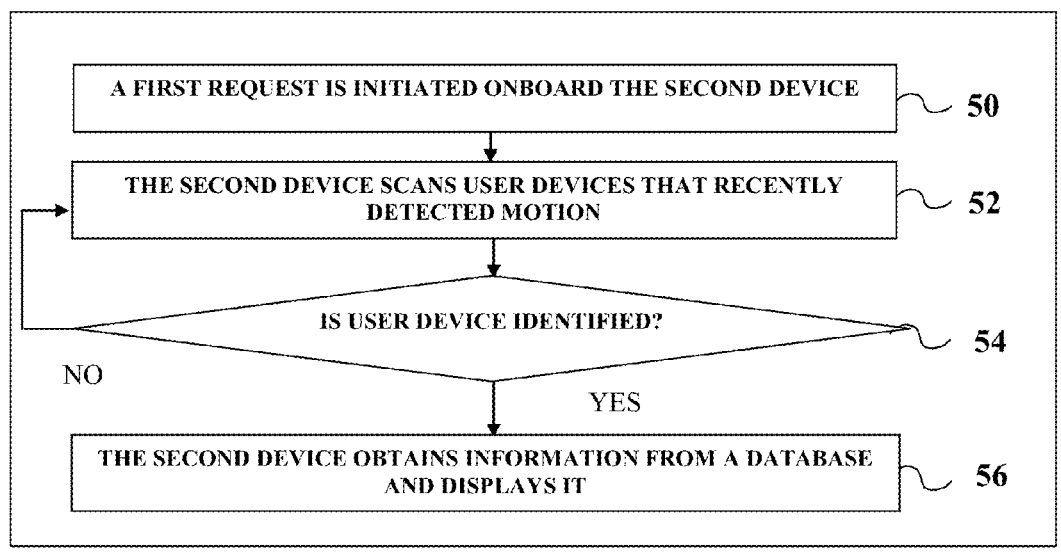
FIG. 5 is a flowchart illustrating a method for obtaining remote device information from a database and displaying it

Referring to FIG. 5, a flowchart illustrates a method for obtaining remote device information from a database and displaying it In step 50, a request is initiated onboard second device 10 to request user information. In step 52, the second device 10 scans mobile devices that recently detected motion. These devices can be Bluetooth LE devices with motion detector, tilt sensor or accelerometer that detect motion, and set a scannable attribute indicating motion is detected, and after a timeout, revert to initial state.

In step 54, if a mobile device that recently detected motion is found, the second device obtains information to a remote database corresponding to the found device and displays it on the second device in step 56. The information can include a photo, a datasheet, a record, a file, a stream and a log.

Figure 6:
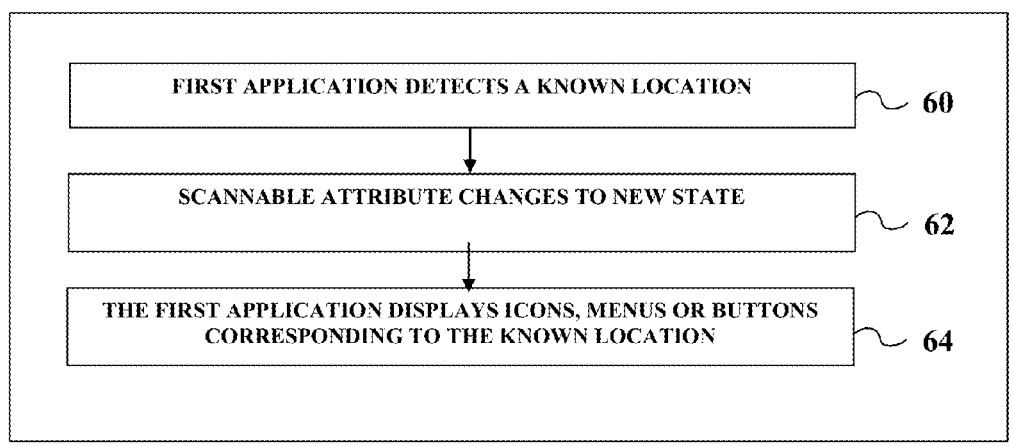
FIG. 6 is a flowchart illustrating a method for displaying icons, menus and buttons based on known location Similar reference numerals are used in different figures to denote similar components.

Referring to FIG. 6, the flowchart illustrates a method for displaying icons, menus and buttons based on known location. In step 60, a first application on the mobile device detects a known location by matching a current GPS to a stored GPS, or by matching a current Wi-Fi network to a stored Wi-Fi or by matching a current Bluetooth beacon in proximity to a stored Bluetooth ID. In step 62, a scannable attribute of the mobile device changes to a new value that indicates the new state or new known location . . . . When the mobile device goes out of the known location, the scannable attribute changes again, and can go to the old value. Upon activation of an icon or button or menu, displaying a new webpage or a new set of information in the first application.

In another embodiment, the application background image changes based on the device location.

In step 64, the first application displays icons, menus or buttons corresponding to the known location. When the user clicks on them, new data is displayed. When the mobile device goes away from the known location, the icons, menus or buttons are not displayed.

In another embodiment, the first application obtains a code from a remote server, Corresponding to the known location, the code can be a number, a string, a license key, a one-time password, a time-based code. The code can correspond to the know location. If the code indicates publishing an attribute, changing the value corresponding to a scannable attribute from an old value to a new value corresponding to the event. If the code indicates not publishing the attribute, not publishing the at least one first attribute. After a predetermined period of time, the attribute can be changed to the old value.

For example, a user goes to a new location. The application on the user's device checks with a license database if that location is valid, and if it is allowed to use the license. If so, the device attributes change to a valid license key or to a code that is accepted by other applications.

Now, other applications that are searching for that code or for that license key can find it, and can recognize it as part of the same network. It is noted that the code can be a one-time password or a time-based code, and that the scanning applications are synched and look for that time-based code.

In another embodiment, a remote server can scan and can detect a first mobile device or a second mobile device, after detecting at least one first mobile device or at least one second mobile device, it sends information to a database wherein the information comprises: a device identifier, the current location of the remote server and a device type.

In another embodiment, the server program searches the database for instances where both a first mobile device and a second mode device were detected together at two different locations at two different times. The server program performs an operation selected from the group consisting of: determine that a person corresponding to the first mobile device moved an item corresponding to the second mobile device, provide a history of who moved the second mobile device, provide a history of what devices were moved by a specific employee corresponding to the first mobile device, and automatically updating an inventory management system with information corresponding to the second mobile device.

The server program can search the database for instances where the second mobile device was detected at two different locations at two different times. The server program automatically updates an inventory management system with location information corresponding to the second mobile device.

The device type can be a first mobile device or a second mobile device.

To run the authorization application, the user logs in to an account on a remote server using the authorization application onboard a user device, such as 12, 13, 14. The sign-up process requires certain information, such as information about a user account. The sign-up process may include other information such as username/password for different accounts, financial account sufficient to perform a transaction with the account. The sign up process can also require contact information for the user, e.g., mailing address and email, and possibly other personal identifying information, e.g., a photograph of the user. After creating an account, the user can select a merchant that also has an account with the card less payment system. When a user signs up with the authorization application, the device unique ID is registered with the user's account so as to guarantee that the account it tightly linked to mobile authentication device 12, 13, 14.

The authorization application can obtain policy information from a remote server policy database. The policy information indicate conditions for authorization such as:

Trusted locations defined by areas around a GPS coordinate or a WIFI network or an area near a known RF transmitter Security rules per trusted location, un-trusted location or area with no network connectivity (no WIFI, no 3G network, and no data network) including: Authentication Type: PIN, No PIN, text challenge authentication, voice challenge authentication, timeout duration (when no user activity), and application self-defense (lock, cloak, alarm, call a phone number, send SMS/Email, wipe application data)

The remote server holds user accounts and can serve as a communication medium between second device 10 and any user device. The remote server can also hold policies that dictate authentication rules. In another preferred embodiment, the remote server is uses as a buffer for communication between second device 10 and other devices. It does not store any user login or authentication information beyond the time span of the transaction. Immediately after second device 10 retrieves the user information, the user login or authentication information is deleted from the remote server. In this embodiment, the user login, authentication information and payment information is encrypted and stored on the user authorization device.

In another embodiment, when launched, the first application publishes a new identifier, the new identifier is different from a previously broadcasted identifier, the new identifier is stored as part of the user account information on the remote server. The second application running onboard a second device obtains a stored identifier corresponding to the user account from the remote server. The stored identifier can be different from the identifier published by the client device. The second application connects to the client device corresponding to the user account using the stored identifier and short wireless communication. The second application sends at least one request wirelessly to the user device. The at least one request includes transaction information selected from the group consisting of: an invoice, a receipt, a reservation, a confirmation, a reward, a charge, transaction details, a coupon, a file, a transaction ID, an encryption key, a decryption key, and information corresponding to the remote client device identifier.

The second device or the client device can obtain policy information from the remote server.

In another embodiment, the invention comprises running a third authentication program onboard a third mobile device, a third authentication program corresponds to the first user identifier or to the user account. The third authentication program can login to a remote server. The third authentication program stores at least one first digital key selected from the group consisting of:
a password, a random key, a one-time-password generator, a certificate, a Private Key Infrastructure (PKI) key, a symmetric key, an asymmetric key, payment information, access information, physical access code, The digital key can be stored in a secure memory location or on a secure element onboard the client device that is distinct from the second device. Upon detecting a user action onboard the client device, such as a button push, a display touch, a motion, a spoken word, and an application brought to the foreground.

If the authentication application obtains a pending authentication request wirelessly from the remote server corresponding to the user identifier, the authentication application displays the transaction information, and requests user approval such as verify a button is activated or a menu is selected or a display is touched or an application is brought to the foreground, authenticate a pass code, authenticate a response to a challenge question, and authenticate biometric information.

The user authentication method can be different from a previously used user authentication method.

Upon or after a successful user authentication, the authentication application posts an authentication information update to the remote server, corresponding to a pending authentication request. The authentication information update can be a digital key. After a period of time, if a first terminal that submitted an authentication request or a transaction for authentication retrieves an authentication information update corresponding to the authentication request, the first terminal uses the authentication information update to: unlock, uncloak, decrypt data, login to an application, authenticate to a remote server, authorize a second transaction, transmit user information wirelessly to a separate terminal, login automatically to an application interface, and call a script.

In another embodiment, the first terminal posts confirmation information corresponding to the transaction to the remote server, the authentication program retrieves the confirmation information, the authentication program displays the confirmation information.

In another preferred embodiment, the first terminal posts confirmation information corresponding to the transaction to the remote server, the authentication program retrieves the confirmation information and the authentication program displays the confirmation information.

In another embodiment, the first terminal can periodically post verification requests to the remote server, wherein if the first terminal does not obtain an update corresponding to a verification request, the first terminal can perform an action selected from the group consisting of: lock, cloak, cancel, reject, and encrypt data.

If the first mobile device detects motion or acceleration signals that are above a pre-determined threshold, an application onboard the first terminal performs an action selected from the group consisting of: lock, cloak, close, and encrypt data.

In another embodiment, the first terminal transmits user information wirelessly to a remote terminal using an RFID emulator or an RFID simulator.

In another embodiment, when a user is logged in to an application, wherein if the current location is within a pre-determined distance from a pre-defined location or if a pre-determined WIFI network is detected, the application is timed out after a first pre-determined period of inactivity. If the current location is not within a pre-determined distance from a known location, the application is timed out after a second pre-determined period of inactivity. The second pre-determined period of inactivity is different from the first pre-determined period of inactivity.

In another embodiment, object code is injected in the authentication application or in the application onboard the first terminal to provide detection/scanning, communication and security capabilities.

In another embodiment, the authentication program/application obtains sensor information from sensors located onboard the first mobile device, such as current location information, acceleration information, gyration information, tilt information, WIFI networks in view information, radio frequency networks in view information, radio frequency signal strength information, lighting level information, audio level information, and temperature information.

The authentication program can post the sensor information to the remote server. If the sensor information does not match at least one pre-determined policy, the authentication program can perform an action selected from the group consisting of: Abort operation, block response, lock, exist, cloak, cancel the current transaction, and encrypt data. If the location of the first terminal is within a pre-determined distance from a predetermined location or if the first terminal is connected to a trusted WIFI network or if the current transaction amount is below a pre-determined threshold, the user can authorize: verify a button is activated, verify a menu is selected, verify or a display is touched, and verify or an application is brought to the foreground.

If the location of the first terminal is outside pre-determined areas or if the first terminal is outside pre-determined WIFI coverage areas or if the current transaction amount is above a pre-determined threshold, the user authentication method can be: authenticate a pass code, or authenticate a response to a challenge question. If the first terminal is not connected to any 3G or WIFI network or if the transaction matches a pre-determined condition, the user authentication method can be selected from the group consisting of: authenticate biometric information, and verify that both the first mobile device and a second mobile device authorized the transaction. The first terminal can obtain a digital key from the authentication information update, decrypt user information using the digital key, and use the decrypted user information to perform an action: login to a user account, fill a form, execute a payment transaction, unlock, and decrypt data.

The authentication application is generally installed from a program repository such as iTunes, Android market or company application store to the user mobile device. The application can be un-installed from the user mobile device, It is noted that upon or after detecting at least one second mobile device that publishes an attribute indicating the second mobile device detected motion, or that its application is in the foreground, the first device connects to the second mobile device, sends a challenge to the second mobile device, obtains a response from the second mobile device, and validates the response. The first mobile device and the second mobile device are distinct.

The details of certain embodiments of the present inventions have been described, which are provided as illustrative examples so as to enable those of ordinary skill in the art to practice the inventions. The summary, figures, abstract and further details provided are not meant to limit the scope of the present inventions, but to be exemplary. Where certain elements of the present inventions can be partially or fully implemented using known components, only those portions of such known components that are necessary for an understanding of the present invention are described, and detailed descriptions of other portions of such known components are omitted so as to avoid obscuring the invention. Further, the present invention encompasses present and future known equivalents to the components referred to herein.

The inventions are capable of other embodiments and of being practiced and carried out in various ways, and as such, those skilled in the art will appreciate that the conception upon which this disclosure is based may readily be utilized as a basis for the designing of other methods and systems for carrying out the several purposes of the present inventions. Therefore, the claims should be regarded as including all equivalent constructions insofar as they do not depart from the spirit and scope of the present invention. The following claims are a part of the detailed description of the invention and should be treated as being included in this specification.

The invention claimed is:

1. A method for adaptive mobile identity comprising:
running a first application onboard a first mobile device,
  wherein the application can be installed from a program repository to the first mobile device,
  wherein the application can be un-installed from the first mobile device,
  wherein upon or after activation of an icon associated with the first application,
    the first application can go from the background to the foreground of the first mobile device;
whereby upon or after the first application goes to the foreground of the first mobile device,
  publishing at least one first scannable attribute indicating the first application is in the foreground,
    wherein the at least one first scannable attribute can be read or can be scanned wirelessly using short wireless communication technology,
    wherein the scannable attribute can change,
    wherein if the first application stops running,
      the at least one first scannable attribute is not published;
whereby upon or after the first application goes from the foreground to the background of the first mobile device,
  changing the value corresponding to the at least one first scannable attribute.

2. The method of claim 1 whereby:
the short wireless communication technology is either BLUETOOTH Low Energy, BLUETOOTH 4.0 or BLUETOOTH;
whereby the at least one first scannable attribute is selected from the group consisting of:
  a service, a characteristic and a descriptor;
whereby if the first mobile device locks or if a menu button is activated,
  the first application can go to the background of the first mobile device.

3. The method of claim 1 comprising:
after the first application stays in the foreground of the first mobile device for more than a predetermined period of time,
or after detecting an icon is activated inside the first application,
or after detecting a button is activated inside the first application,
or after detecting a menu is activated inside the first application,
or after the first application detecting a remote short wireless device
or after the first application connecting to a remote short wireless device
or after the first application detecting motion
or after the first application detecting a known location using a means selected
from the group consisting of: GPS, WIFI and Bluetooth beacon,
  either changing the value corresponding to the at least one first scannable attribute
  or not publishing the at least one first scannable attribute or publishing at least one third scannable attribute that was not recently published.

4. The method of claim 1 comprising:

after detecting a known location using a means selected from the group consisting of: GPS, WIFI and Bluetooth beacon,
 either displaying a first set of icons or buttons inside the first application, wherein the first set of icons or buttons is different from a second set of icons or buttons displayed when the known location is not detected,
  wherein upon activating an icon or button, displaying a new webpage or a new set of information,
 or displaying a first set of menus inside the first application, wherein the first set of menus is different from a second set of menus displayed when the known location is not detected,
  wherein upon activating an icon or button, displaying a new webpage or a new set of information,
 or displaying a first background image inside the first application, wherein the first background image is different from a second background image displayed when the known location is not detected.

5. The method of claim 1 comprising:

scanning at least one client device using a second application running onboard a remote device,
identifying at least one client device with the first application is running in the foreground of the at least one client device,
sending at least one wireless request from the remote device to the at least one client device,
 wherein the at least one wireless request includes transaction information selected from the group consisting of:
  an invoice, a receipt, a reservation, a confirmation, a reward, a charge, transaction details, a coupon, a file, a transaction ID, an encryption key, a decryption key, and information corresponding to the client device.

6. The method of claim 5 comprising:

displaying at least one part of the transaction information onboard the at least one client device;
after obtaining a user action onboard the at least one client device,
 providing a response to the remote device,
 wherein the response includes user data selected from the group consisting of:
  user payment information, user access information, user information, a user password, a user digital key, a user digital payment certificate, a confirmation ID, a user signature, and a one-time password,
 wherein the user data is stored onboard the at least one client device,
 wherein the user action is selected from the group consisting of:
a button activation, a menu selection, a touch, a tap, a motion, and submitting user credentials.

7. The method of claim 5 whereby:

if the strength of the signal between the remote device and a client device is less than a predetermined signal threshold,
or if the estimated distance between the remote device and the client device is longer than a predetermined distance threshold,
 the second application running onboard the remote device does not send a wireless request to the client device.

8. The method of claim 5 whereby:

the at least one wireless request is sent through either short wireless communication technology or through cellular network communication;
whereby the second application uses the response to perform an action selected from the group consisting of:
 fill a form, decrypt data, encrypt data, login, submit a request to a payment processor, submit a request to a payment Application Programming Interface, authorize a transaction, and send the response or part thereof to a remote terminal.

9. A method for an adaptive mobile identity comprising:

running a first application onboard a first mobile device,
 wherein the application can be installed from a program repository to the first mobile device,
 wherein the application can be un-installed from the first mobile device,
 wherein upon or after activation of an icon associated with the first application, the first application can go from the background to the foreground of the first mobile device,
whereby upon or after the first application starts,
 publishing at least one first scannable attribute,
  wherein the at least one first scannable attribute can be read or can be scanned wirelessly using short wireless communication technology,
  wherein the value corresponding to the at least one first scannable attribute can change,
  wherein if the first application stops running,
   the at least one first scannable attribute is not published;
whereby upon or after an event selected from the group consisting of:
 the first application detects a known location using a means selected from the group consisting of: a GPS, WIFI and a Bluetooth beacon,
 the first application detects motion or tilt or acceleration onboard the first mobile device,
 the first application goes from the background to the foreground of the first mobile device,
 the first application connects to a remote device using short wireless communication technology,
 the first application connects to a WIFI network,
 the first application detects a user action corresponding to activating an icon inside the first application running onboard the first mobile device,
 the first application detects a user action corresponding to activating a button inside the first application running onboard the first mobile device, and the first application detects a user action corresponding to activating a menu inside the first application running onboard the first mobile device,
  either changing the value corresponding to the at least one first scannable attribute from an old value to a new value corresponding to the event
  or not publishing the at least one first scannable attribute
  or publishing at least one second scannable attribute that was not published prior to the event.

10. The method of claim 9 comprising:

the first application detects a first known location using a means selected from the group consisting of: a GPS, WIFI and a Bluetooth beacon,
displaying a first set of icons or buttons inside the first application, wherein the first set of icons or buttons is different from a second set of icons or buttons displayed when the known location is not detected, wherein upon activation of an icon or button, displaying a new webpage or a new set of information in the first application, or displaying a first set of menus inside the first application, wherein the first set of menus is different from a second set of menus displayed when the known location is not detected, wherein upon activation of an icon or button, displaying a new webpage or a new set of information inside the first application, or displaying a first background image inside the first application, wherein the first background image is different from a second background image displayed when the known location is not detected.

11. The method of claim 9 comprising:

the first application obtains a code from a remote server, wherein the code corresponds to the known location, wherein the code is selected from the group consisting of:

publish rules, a number, a string, a license key, a one-time key and a time-based key;

the first application changes he value corresponding to the at least one first scannable attribute from an old value to a new value corresponding to the code.

12. The method of claim 9 comprising:

the first application obtains a code from a remote server, wherein the code corresponds to the known location; publishing the code.

13. The method of claim 9 comprising:

after a predetermined period of time, changing the value corresponding to the at least one first scannable attribute back to the old value.

14. A method for an adaptive mobile identity comprising:

running a first program onboard a first mobile device, wherein the first program can be installed from a program repository to the first mobile device, wherein the first program can be un-installed from the first mobile device, wherein the first program can go from the foreground to the background of the first mobile device, publishing at least one first scannable attribute that can be read or can be scanned wirelessly using short wireless communication technology, wherein the at least one first scannable attribute can change, wherein if the first program stops running, the at least one first scannable attribute is not published;

running a second program onboard a second mobile device, wherein the second mobile device is distinct from the first mobile device, wherein the second program can be installed from a program repository to the second mobile device, wherein the second program can be un-installed from the second mobile device, whereby upon or after an event selected from the group consisting of:

the second program detects a known location using a means selected from the group consisting of: a GPS, WIFI and a Bluetooth beacon, the second program detects motion or tilt or acceleration onboard the second mobile device, the second program goes from the background to the foreground of the second mobile device, the second program connects to a remote device using short wireless communication technology, the second program connects to a WIFI network, the second program detects a user action corresponding to activating an icon inside the second program running onboard the second mobile device, the second program detects a user action corresponding to activating a button inside the second program running onboard the second mobile device, and the second program detects a user action corresponding to activating a menu inside the second program running onboard the second mobile device, changing the value corresponding to at least one second scannable attribute from an old value to a new value corresponding to a new state, wherein the at least one second scannable attribute can be read or can be scanned wirelessly using short wireless communication technology, wherein after the second mobile device stays idle for a predetermined period of time or the second program disconnects from a remote device or the second program detects a new location or the second program detects a user action, the value corresponding to the at least one second scannable attribute can change from the new value to a different value;

whereby upon or after the first mobile device detects at least one second mobile device running the second program, wherein the second mobile device publishes an attribute indicating the new value, either sending information to the database comprising identifiers of the at least one second mobile device and the current location of the first mobile device or searching a database for item information corresponding to the at least one second mobile device and displaying the item information onboard the first mobile device, wherein the item information is selected from the group consisting of a photo, a datasheet, a record, a file, a stream a string and a log.

15. The method of claim 14 whereby:

a scanner device can scan and can detect at least one first mobile device and at least one second mobile device, wherein upon or after detecting at least one first mobile device or at least one second mobile device, sending information to a database wherein the information comprises:

a device identifier, the current location of the scanner device and a device type, wherein the device type can be a first mobile device or a second mobile device.

16. The method of claim 14 comprising:

a server program searches the database for instances where both a first mobile device and a second mode device were detected together at two different locations at two different times;

whereby the server program performs an operation selected from the group consisting of:

determine that a person corresponding to the first mobile device moved an item corresponding to the second mobile device, provide a history of who moved the second mobile device, provide a history of what devices were moved by a specific employee corresponding to the first mobile device, and automatically updating an inventory management system with information corresponding to the second mobile device.

17. The method of claim 14 comprising:

a server program searches the database for instances where the second mobile device was detected at two different locations at two different times, whereby the server program automatically updates an inventory management system with location information corresponding to the second mobile device.

18. The method of claim 14 comprising:

upon or after the first program goes from the foreground to the background of the first mobile device, changing the value corresponding to the at least one first scannable attribute, wherein the at least one first scannable attribute indicates the first program is running in the background of the first mobile device.

19. The method of claim 14 comprising:

upon or after the second program detects motion or tilt or acceleration onboard the second mobile device, changing the value corresponding to at least one second scannable attribute from an idle state to a motion state, wherein after the second mobile device stays idle for a predetermined period of time, changing the value corresponding to the at least one second scannable attribute from the motion state to a different state.

20. The method of claim 14 comprising:

upon or after detecting at least one second mobile device, wherein the second mobile device publishes an attribute indicating the new value, connecting to the at least one second mobile device, sending a challenge to the at least one second mobile device, obtaining a response from the at least one second mobile device, validating the response.

\* \* \* \* \*